United States Patent [19]
Fusek et al.

[11] Patent Number: 4,712,851
[45] Date of Patent: Dec. 15, 1987

[54] POSITIONING ALIGNMENT APPARATUS AND METHOD USING HOLOGRAPHIC OPTICAL ELEMENTS

[75] Inventors: Richard L. Fusek, Pleasanton; Lawrence H. Lin, Alamo, both of Calif.

[73] Assignee: Insystems, Inc., San Jose, Calif.

[21] Appl. No.: 835,779

[22] Filed: Mar. 3, 1986

[51] Int. Cl.[4] ............................................. G03H 1/04
[52] U.S. Cl. ..................................... 350/3.6; 356/138
[58] Field of Search .................. 350/3.6, 3.69, 3.73; 356/138, 151, 153

[56] References Cited

U.S. PATENT DOCUMENTS

| | | | |
|---|---|---|---|
| 3,470,377 | 9/1969 | LeFebre et al. | 356/138 |
| 3,551,057 | 12/1970 | Hamilton et al. | 356/153 |
| 3,802,758 | 4/1974 | Havener et al. | 350/3.6 |
| 4,510,575 | 4/1985 | Mueller et al. | 350/3.6 |
| 4,516,833 | 5/1985 | Fusek | 350/162.12 |
| 4,620,089 | 10/1986 | Schlichting et al. | 350/3.6 |

*Primary Examiner*—Bruce Y. Arnold
*Assistant Examiner*—Martin Lerner
*Attorney, Agent, or Firm*—Stoel Rives Boley Jones & Grey

[57] ABSTRACT

An apparatus and a method employ on a subject at least one holographic optical element that develops two beams of focused light whose focal configurations appear in predetermined locations which correspond to the position of the subject in the system. In a first preferred embodiment, two holographic optical elements are recorded on a subject that is to be aligned and supported by a holder assembly. During exposure of the holographic optical elements, the light rays passing through the plate converge of two focal points that have position coordinates which define their locations in the coordinate space of the optical system. Each focused point of light strikes a position sensitive detector which develops output signals that represent the position coordinates of the focused point of light in the system. After it has been removed from and returned to the holder assembly, the plate is aligned in proper position the two focused points of light strike the areas on the detectors which provide output signals that correspond to the position coordinates produced during exposure. In a second preferred embodiment, a single holographic optical element is recorded on the surface of a glass plate and develops the first and second beams of light that converge to different focal points in the optical system.

18 Claims, 10 Drawing Figures

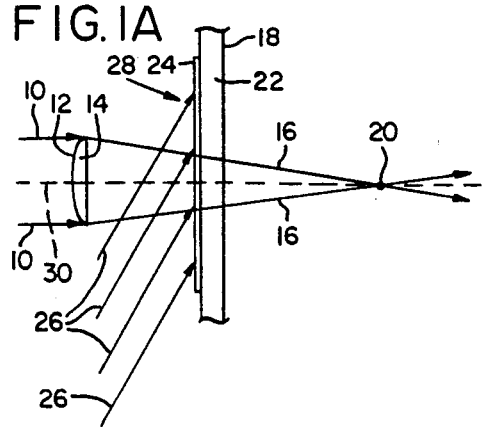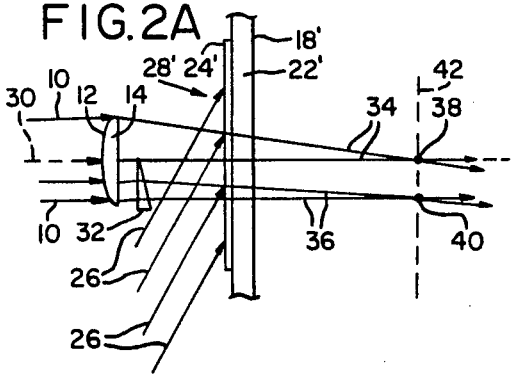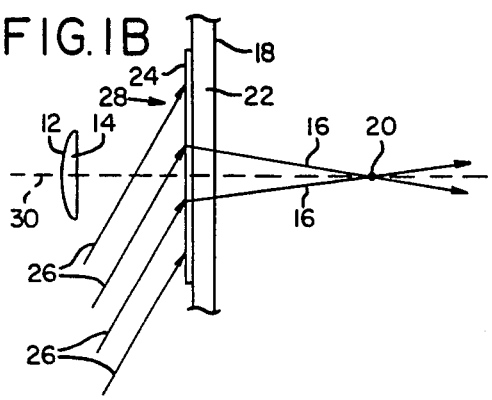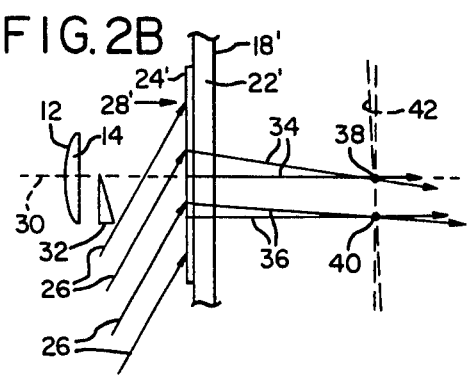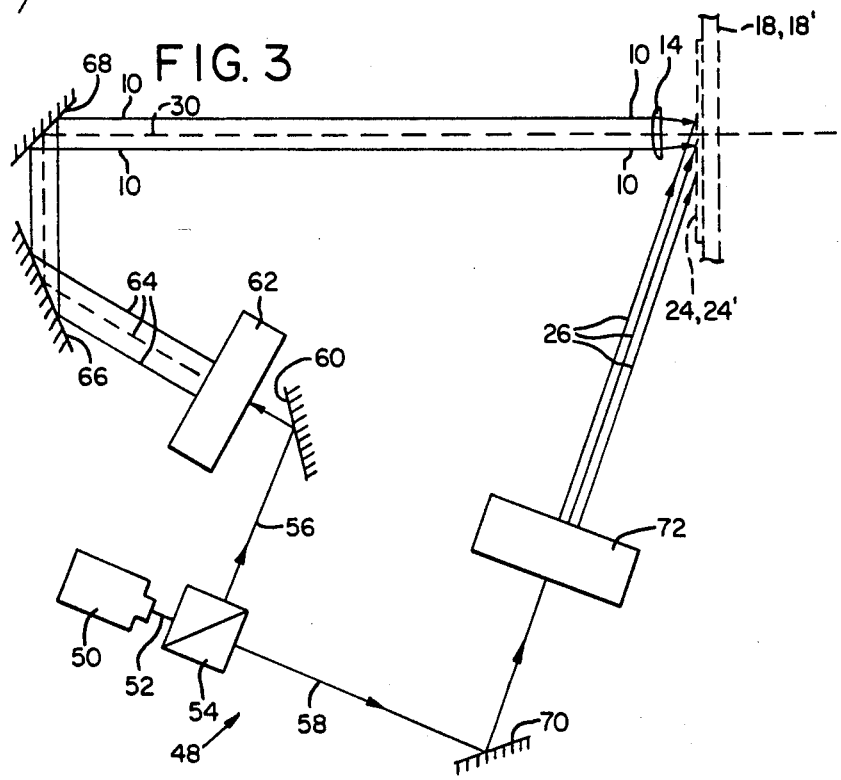

POSITIONING ALIGNMENT APPARATUS AND METHOD USING HOLOGRAPHIC OPTICAL ELEMENTS

BACKGROUND OF THE INVENTION

The present invention relates to techniques for aligning a subject in a space coordinate system, and in particular, an apparatus and a method that employ on a subject at least one holographic optical element for developing two beams of focused light whose focal configurations appear in predetermined locations which correspond to the position of the subject in the system.

Systems of various types often require that a component included therein be oriented in an initial position, displaced from the initial position or removed from the system, and later returned to the initial position in the system. U.S. Pat. No. 4,516,833 of Fusek exemplifies an optical system of this type.

In the system of Fusek, a photographic plate positioned in the Fourier transform plane is exposed with light of a predetermined intensity diffracted by a photomask. The photographic plate, which comprises a flat glass substrate, is supported by a holder in the optical system. Having been exposed to the diffracted light rays, the glass plate is removed from the holder, photographically developed returned to the holder, and aligned in exactly the position it occupied during exposure. A hologram of the photomask is recorded from the light rays passing through the plate, which functions as an optical filter. The diffracted light rays must strike the same locations on the plate; therefore, the plate must occupy the same position it held during exposure.

To meet the critical alignment requirements for fulfilling this objective, the holder must be secured in a stationary position in the optical system and be designed so that the plate can be returned to the same position it occupied during exposure. Relying on close tolerances in the fabrication of the plate and holder is insufficient for preventing misalignment that results from, for example, a chip present along a side margin of the glass plate.

SUMMARY OF THE INVENTION

An object of the present invention is, therefore, to provide an apparatus and a method for aligning a subject in a space coordinate system so that the subject can be displaced from a preassigned position and later realigned to occupy the same position in the system.

Another object of this invention is to provide such an apparatus and a method for accurately realigning a photographic plate functioning as a filter in an optical system.

A further object of this invention is to provide such a method and an apparatus that facilitates an exact alignment of the photographic plate when a chip is present along one of its side margins.

The present invention is an apparatus and a method for aligning a subject, such as, for example, a glass photographic plate requiring alignment within in an optical system. The subject has a predetermined position in the optical system, which position is uniquely specified by translation and rotation coordinates in a space coordinate system. In both the apparatus and the method, at least one holographic optical element provided on a surface of the subject forms first and second light beams having respective first and second predetermined focal configurations.

In a first preferred embodiment of the invention, two holographic optical elements are recorded in relatively small generally circular regions on opposite sides of the same surface of a flat glass plate that is supported by a holder assembly. Each holographic optical element is formed by positioning a small lens adjacent the region on the surface of the plate. A subject beam of parallel coherent light rays passes through the lens element and exposes a photosensitive recording medium applied on the region of the plate. A reference beam of coherent light rays also exposes the recording medium and interferes with the light rays refracted by the lens to form an interference pattern in the region of the plate.

The light rays passing through the plate converge to a focal point that has position coordinates which define its location in the coordinate space of the optical system of which the plate comprises a part. The focused point of light propagating through each holographic optical element is received by a position detecting means, such as a quadrant detector, which senses the intensity and develops signals that represent the position coordinates of the focused point of light incident on it. The two position detecting means are operable to record information corresponding to the position coordinates.

The plate is then removed from the optical system for photographic development and further processing of the exposed regions to form the holographic optical elements. The plate is returned to the holder assembly and realigned to its exposure position by blocking the subject beam and illuminating both holographic optical elements with the original reference beam. Each holographic optical element forms one of the light beams that are received by the quadrant detectors.

There are alternative techniques for ensuring that the plate is returned to its exposure position in the system. The first technique employs during exposure a subject beam whose light rays propagate in a direction normal to the surface of the plate and a holder assembly that secures the plate seated therein in a position along the optic axis of the system. The propagation direction of the subject beam causes the formation of holographic optical elements whose optic axes are parallel to the optic axis of the system, which axis is normal to the surface of the plate. The holder assembly for the glass plate is operable for translational and rotational movement within a plane defined by the surface of the plate. The plate is aligned so that the two focused points of light strike the detectors in an orientation that produces output signals which correspond to the translation and rotation coordinates of the plate in the exposure position. Restricting the motion of the plate to its surface plane allows the exact realignment of the plate to its exposure position in the system.

In effect, one quadrant detector serves to align the plate for translation, and the other quadrant detector is used as a linear position detector to align the plate for rotation about the optic axis within the surface plane of the plate. The position coordinate information of the two quadrant detectors together specify, therefore, the exposure position of the plate in the system.

The second technique employs during exposure a subject beam whose light rays propagate in a direction inclined at an angle relative to the normal to the surface of the plate and the optic axes of the small lenses. The propagation direction of the subject beam causes the formation of holographic optical elements whose optic axes are angularly inclined relative to the optic axis of the system. Angularly inclining the optic axes of the holographic optical elements creates two off-axis points of focused light relative to the system axis and enables the alignment of the plate in the six degrees of freedom (i.e., three in translation and three in rotation) with the use of two quadrant detectors. The holder assembly for the plate can be operable, therefore, for translational and rotational movement within a plane defined by the surface of the plate and for translational movement along the optic axis of the system.

In a second preferred embodiment of the invention, a single holographic optical element recorded in a small generally circular region on the surface of a flat glass plate develops the first and second beams of light that converge to different focal points in the optical system. The single holographic optical element is formed by positioning a glass wedge between a small lens and the region on the surface of the plate. The lens receives and refracts the parallel light rays of a subject beam. The wedge separates the refracted light rays into two bundles of light rays that interfere with the reference beam in a photosensitive recording medium applied on the region of the plate and form two different focused points of light in a manner similar to that described above for the first embodiment. The operation of the position detecting means and the procedures for re-aligning the plate to its exposure position are analogous to those described above for the first preferred embodiment.

Additional objects and advantages of the present invention will be apparent from the following detailed description of preferred embodiments thereof, which proceeds with reference to the accompanying drawings.

BRIEF DESCRIPTION OF THE DRAWINGS

FIGS. 1A and 1B are diagrams showing the focal configuration of the light rays developed in the construction and reconstruction, respectively, of one of the holographic optical elements of the first preferred embodiment of the invention.

FIGS. 2A and 2B are diagrams showing the focal configuration of the light rays developed in the construction and reconstruction, respectively, of the single holographic optical element of the second preferred embodiment of the invention.

FIG. 3 is a diagram of the apparatus used for constructing the holographic optical elements of the first and second preferred embodiments of the invention.

DETAILED DESCRIPTION OF PREFERRED EMBODIMENTS

Figure 4A:
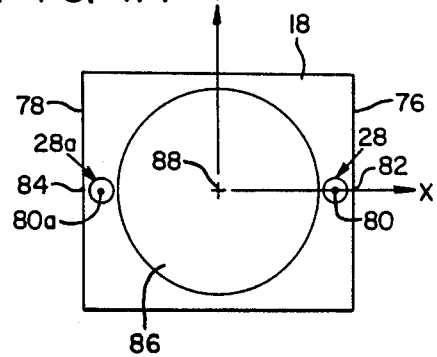
FIGS. 4A and 4B are frontal elevation views of the glass plates that include the holographic optical elements constructed with the apparatus of FIG. 3 for, respectively, the first preferred embodiment and the second preferred embodiment.

The first and second preferred embodiments of this invention employ at least one holographic optical element to develop two beams of light. Each one of the beams converges to a point of focused light in space. FIGS. 1A and 1B are diagrams showing for the first embodiment the construction geometry and reconstruction geometry, respectively, of one of the holographic optical elements that develop a single beam of light which converges to a focal point. The other holographic optical element is aligned adjacent the one holographic optical element in a plane perpendicular to that of FIGS. 1A and 1B. The description directed below to FIGS. 1A and 1B applies to both holographic optical elements of the first preferred embodiment.

With reference to FIG. 1A, a subject beam 10 of parallel coherent light rays, which are emitted preferably from a laser source (not shown), strikes the convex surface 12 of a convex-plano lens 14 which refracts the light rays passing through it. A bundle of refracted light rays 16 strikes and propagates through a transparent plate 18 and converges to a focal point 20. Plate 18 comprises a transparent substrate 22, such as glass, with substantially flat surfaces. A thin layer of about 4 to 20 microns of holographic recording material 24 (shown in enlarged scale) is applied on a generally circular region of one of the surfaces of substrate 22.

A reference beam 26 of parallel coherent light rays interferes with the refracted light rays of subject beam 10 in holographic recording material 24 to construct a holographic optical element 28. Lens 14 is positioned so that its optic axis 30 is parallel to the light rays of subject beam 10 and is normal to the surfaces of plate 18. Under these conditions, focal point 20 lies along optic axis 30 of lens 14. Reference beam 26 strikes glass plate 18 at an angle relative to its surface normal in the typical manner for constructing an off-axis hologram. It will be appreciated, however, that the alignment techniques of the present invention are not restricted to off-axis holograms. Moreover, the present invention does not require that the light rays of subject beam 10 and reference beam 26 be parallel; the parallel light rays are used herein for purposes of clarity only.

With reference to FIG. 1B, the reconstruction of the refracted light rays that converge to focal point 20 is accomplished by illuminating holographic optical element 28 with the light rays of reference beam 26. Whenever glass plate 18 occupies the same position in reconstruction as that in construction of holographic optical element 28, focal point 20 appears in the same location along optic axis 30.

FIGS. 2A and 2B are diagrams showing for the second embodiment the construction geometry and the reconstruction geometry, respectively, of a single holographic optical element that develops two beams of light which converge to two different focal points. In FIGS. 1A and 1B and FIGS. 2A and 2B, certain ones of the light rays and optical elements are either the same as or analogous to each other. For convenience, identical reference numerals indicate the same elements and identical reference numerals followed by primes indicate the analogous elements in all of the figures presented herein.

With reference to FIG. 2A, a beam splitting means or optical wedge 32 is positioned between lens 14 and holographic recording material 24' to cover the lower half of lens 14 below its optic axis 30. The portion of the incident beam that strikes wedge 32 is angularly deviated toward the thicker part of the wedge. Lens 14 and wedge 32 cooperate to produce two bundles of light beams 34 and 36 that converge to the respective focal points 38 and 40. Wedge 32 can be positioned alternatively adjacent surface 12 of lens 14 to develop the desired bundles of light beams. Focal points 38 and 40 lie along a line 42 that is approximately normal to optic axis 30 of lens 14 and parallel to the surfaces of plate 18'. (The optical path of light rays propagating through wedge 32 is slightly longer because of the higher index of refraction of glass relative to that of air.) The parallel light rays of reference beam 26 interfere with the light rays traveling through lens 14 and wedge 32 in holographic recording material 24' to form the holographic optical element 28'.

With reference to FIG. 2B, light beams 34 and 36 are reconstructed by illuminating holographic optical element 28' with the reference beam in the same manner as that described with reference to FIG. 1B. It will be appreciated that the use of optical wedge 32 enables the recording of a single holographic optical element 28' that has two different focal points that lie along line 42.

It will be appreciated that the holographic optical elements of the first and second preferred embodiments can be constructed to form a focal configuration that is different from a point of focused light.

FIG. 3 is a diagram of a side elevation view of an optical subsystem 48 that produces subject beam 10 and reference beam 26 in the construction and reconstruction of the holographic optical elements of the first and second preferred embodiments of FIGS. 1A and 1B and FIGS. 2A and 2B, respectively.

With reference to FIG. 3, a laser 50 develops a beam of coherent light 52 that strikes a beam splitter 54 which divides beam of light 52 into a subject beam component 56 and a reference beam component 58. Subject beam component 56 reflects off mirror 60 and strikes beam expander 62 which provides an output of parallel coherent light rays 64 that cover an area which is sufficient to illuminate lens 14 as will be described below. The light rays 64 that exit beam expander 62 strike mirrors 66 and 68 which are angularly disposed so that the light rays 10 reflected by mirror 68 propagate in a direction parallel to optic axis 30 of lens 14. Reference beam component 58 that exits beam splitter 54 reflects off mirror 70 and strikes beam expander 72. Beam expander 72 produces coherent parallel light rays 26 that strike either plate 18 of FIG. 1A or plate 18' of FIG. 2A.

FIG. 4A is a frontal elevation view of plate 18 with the two holographic optical elements of the first preferred embodiment. Holographic optical element 28, which is also shown in FIGS. 1A and 1B, appears on the right-hand side of FIG. 4A. Holographic optical element 28a appears on the left-hand side of FIG. 4A and corresponds to holographic optical element 28. The corresponding parts of holographic optical elements 28 and 28a are, therefore, designated by identical reference numerals followed by a lower case "a."

Figure 5B:
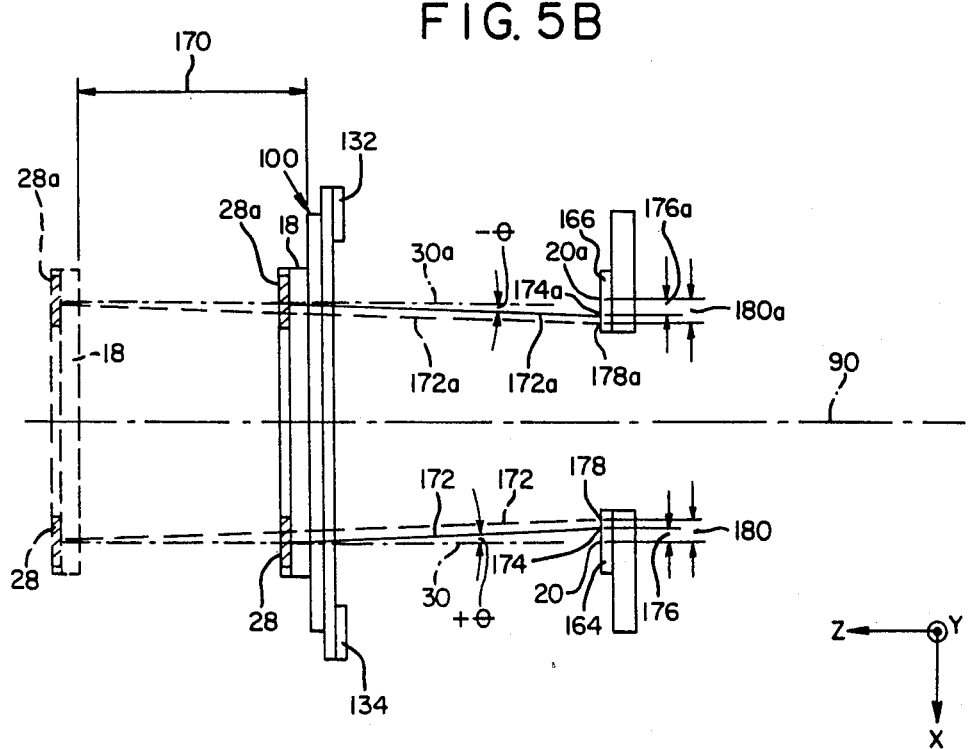
FIG. 5B is a plan view diagram of the embodiment of FIG. 5A with holographic optical elements modified to provide angularly inclined focal configurations that permit in the alignment technique of the present invention the repositioning of the holder assembly of FIG. 5A along the Z axis.
Figure 5A:
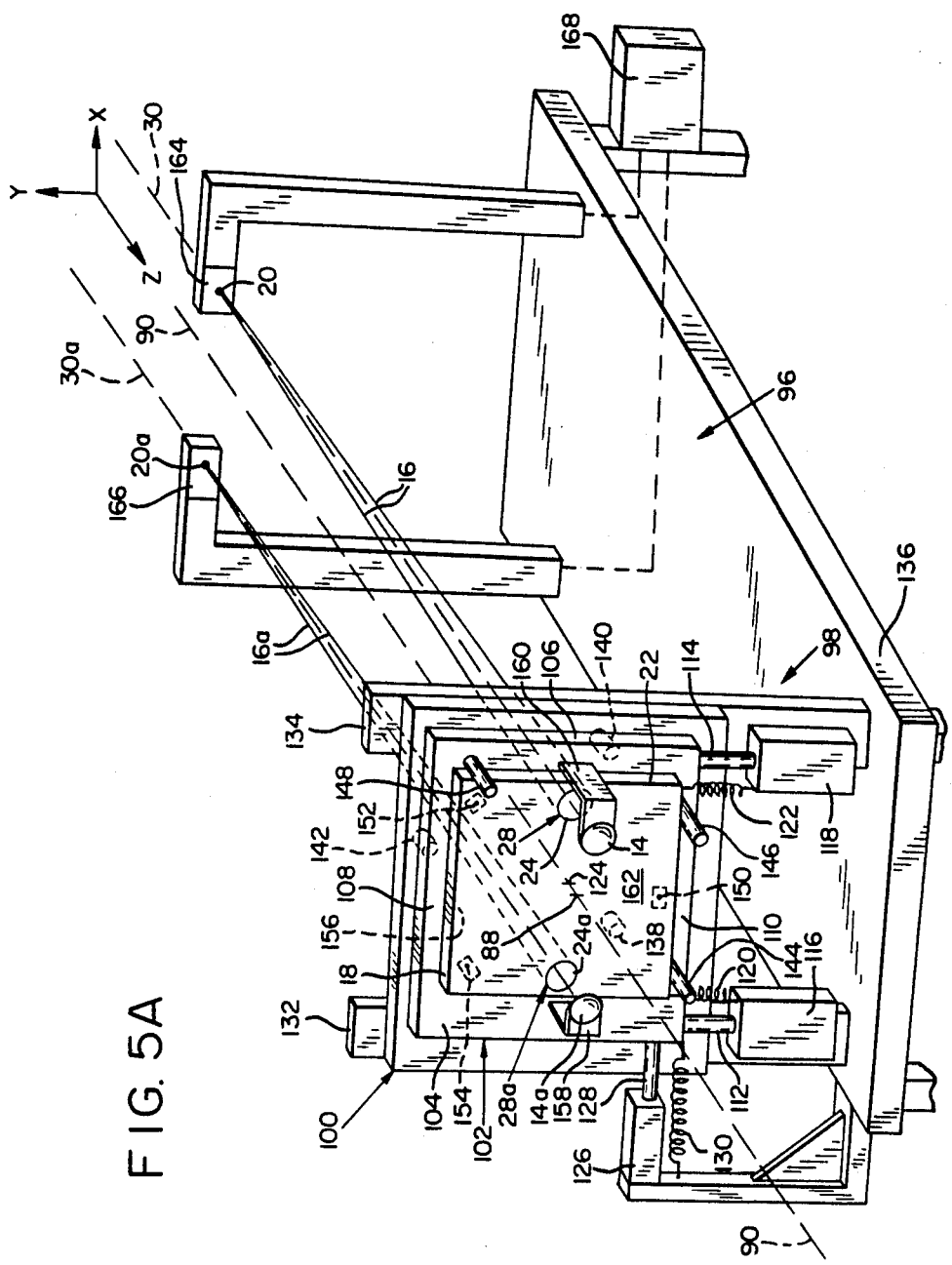
FIG. 5A is an isometric view of the adjustable holder assembly and the position detecting means of the first preferred embodiment of the invention.

With reference to FIG. 4A, plate 18 includes a first holographic optical element 28 and a second holographic optical element 28a. Holographic optical element 28a is constructed with the use of a separate lens 14a (FIG. 5A) in a manner similar to that described for holographic optical element 28. Holographic optical elements 28 and 28a be constructed simultaneously with the use of the optical system 48 of FIG. 3. Holographic optical elements 28 and 28a are constructed near the respective vertical margins 76 and 78 of plate 18 and have diameters of approximately 0.7 centimeters. The center 80 of holographic optical element 28 is collinear with the midpoint 82 of the right-hand vertical margin 76 and with optic axis 30 of lens 14 (FIG. 5A). The center 80a of holographic optical element 28a is collinear with the midpoint 84 of left-hand vertical margin 78 and with optic axis 30a of lens 14a (FIG. 5A).

The circular region 86 of plate 18 represents, for example, the usable area of a subject photographic plate functioning as a spatial filter for which holographic optical elements 28 and 28a provide an exact alignment. The center point 88 of region 86 and plate 18 lies along the system optic axis 90 (FIGS. 5A and 5B, FIG. 6) and serves as the origin for the space coordinate system of the optical system as will be described below.

Figure 4B:
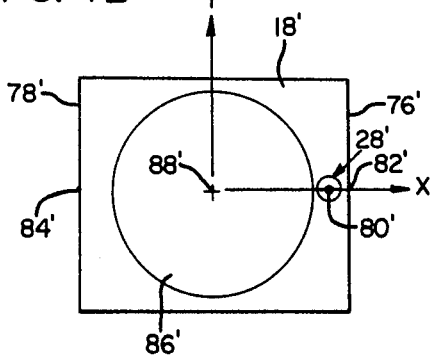

FIG. 4B is a frontal elevation view of plate 18' with the single holographic optical element 28' of the second preferred embodiment. The description of the arrangement of holographic optical element 28' on glass plate 18' is applicable to that set forth above for holographic optical element 28 of FIG. 4A. It will be appreciated that for either the first or second preferred embodiments, the holographic optical elements can be positioned in any convenient location on plates 18 or 18'.

FIG. 5A shows an optical subsystem 96 that comprises adjustable holder means or assembly 98 which supports plate 18 and receives the light rays directed to it by optical subsystem 48 (FIG. 3) during exposure and reconstruction in accordance with the first preferred embodiment of the invention.

With reference to FIG. 5A, holder assembly 98 comprises a stationary support frame 100 for a rectangular main frame 102 that includes a vertical left side member 104, a vertical right side member 106, a horizontal top member 108, and a horizontal bottom member 110. Main frame 102 is supported near the edges of its bottom member 110 by the extensible cylinders 112 and 114 of respective first and second motor-driven micrometers 116 and 118. Biasing springs 120 and 122 are connected between bottom member 110 and micrometers 116 and 118, respectively, to stabilize main frame 102 along the Y axis in the position dictated by cylinders 112 and 114. Optic axis 90 passes through the center 124 and is normal to the plane of the surface of main frame 102. Holder assembly 98 is oriented so that micrometers 116 and 118 move main frame 102 in the X-Y plane of the space coordinate system defined in FIG. 5A. A third motor-driven micrometer 126 has an extensible cylinder 128 that is positioned against the lower portion of vertical left side member 104 for urging frame 102 in the X direction. Biasing spring 130 is connected to the lower portion of vertical side member 104 to stabilize main frame 102 along the X axis in the position dictated by micrometer 126. Stationary support frame 100 is mounted to a pair of vertical support members 132 and 134 which are secured to a mounting surface 136. This arrangement serves to restrict the movement of main frame 102 to only that in the X-Y plane.

Main frame 102 is secured to support frame 100 by three vacuum pads 138, 140, and 142 whose amounts of suction are controlled by a vacuum pressure supply (not shown). Metal pins 144, 146, and 148 extend from the surface of main frame 102 in a direction generally parallel to optic axis 90. Metal pins 144 and 146 are positioned near the respective left- and right-hand corners of main frame 102, and metal pin 148 is positioned near the upper right-hand corner of main frame 102. Plate 18 is positioned against metal pins 144, 146, and 148. Vacuum pads 138, 140, and 142 are operable to apply strong vacuum pressure direct (1) to the opposed surfaces of support frame 100 and main frame 102 to secure them together and (2) through holes 150, 152, and 154 in main frame 102 to the back surface 156 of plate 18 to secure it rigidly in position against pins 144, 146, and 148. Main frame 102 is provided with internal passageways (not shown) to direct the vacuum pressure to holes 150, 152, and 154. Lenses 14 and 14a are rigidly secured to main frame 102 by the respective brackets 158 and 160.

During the construction of holographic optical elements 28 and 28a, the parallel light rays of subject beam 10 (FIG. 3) propagate in a direction that is parallel to optic axis 90 and interfere with the parallel light rays of reference beam 26 (FIG. 3) in the regions of holographic recording material 24 and 24a applied on the surface 162 of plate 18.

The light rays 16 passing through the holographic recording material 24 on plate 18 converge at point 20, and the light rays 16a passing through holographic recording material 24a of plate 18 converge at point 20a. A pair of position detecting means 164 and 166 are oriented to receive the light at the respective focal points 20 and 20a.

Position detecting means 164 and 166 are preferably quadrant detectors of the type that sense the centroid of a light spot and provide output signals that change in response to the position of the spot as it traverses the active area of the detector. Whenever a light beam is centered on a quadrant detector of the type described, the output currents from each element included in the detector are equal, thereby indicating a centered position of the focal point on the detector. As the focal point moves from the center of the detector, a current imbalance occurs, thereby indicating an off-center position of the focal point. Each quadrant detector provides information in the form of electrical signals that indicate the position coordinates of the focused light relative to the center of the quadrant detector. An exemplary quadrant detector whose application is useful in the present invention is a Model SD-380-23-21 position sensor manufactured by Silicon Detector Corporation, Newbury Park, Calif. 91320. The position coordinate information is preferably recorded in a recording means or memory 168.

The position coordinate information produced by a quadrant detector is not affected by its location along the Z axis. Position detectors 164 and 166 remain stationary after the position quadrant information of the respective focal points 20 and 20a have been recorded.

Plate 18 is typically removed from main frame 102 for photographic processing and development. Frequent handling of plate 18 during the photographic and other processing typically causes chips to appear along the side margins of its glass substrate 22. Whenever a chip appears along its bottom or right side margins, plate 18 cannot be accurately realigned against metal pins 144, 146, and 148 without compensation of some kind to achieve the exact position it occupied during the exposure construction of the holographic optical elements 28 and 28a. Such chips do not, however, affect the alignment of plate 18 in the Z direction.

Whenever plate 18 is returned to and secured in holder assembly 98 by vacuum pads 138, 140, and 142, only the light rays of reference beam 26 illuminate holographic optical elements 28 and 28a. It will be appreciated that the light rays of reference beam 26 propagate at an angle relative to the surface normal of plate 18 so that they do not pass through lenses 14 and 14a. The light rays reconstructed from holographic optical elements 28 and 28a form the respective focal points 20 and 20a. If plate 18 does not occupy the same position as it did during construction, quadrant detectors 164 and 166 will not produce the same position coordinate information relating to the locations of the respective focal points 20 and 20a.

The misalignment of plate 18 is corrected by computing the distances the extensible cylinders 112, 114, and 128 of the respective micrometers 116, 118, and 126 must travel to return plate 18 to its construction orientation. Movement of plate 18 is accomplished in the X direction by moving extensible cylinder 128 of micrometer 126 and in the Y direction by moving both extensible cylinders 112 and 114 of the respective micrometers 116 and 118 in the same direction at the same speed.

Rotation of plate 18 in the X-Y plane is also necessary to achieve the exact alignment of the construction orientation and thereby return the position coordinate readings of quadrant detectors 164 and 166 to their original values. Rotation of plate 18 in the clockwise direction is accomplished by increasing the effective length of extensible cylinder 112 of micrometer 116 relative to that of extensible cylinder 114 of micrometer 118. Similarly, rotation of plate 18 in the counterclockwise direction is accomplished by increasing the effective length of extensible cylinder 114 of micrometer 118 relative to the length of extensible cylinder 112 of micrometer 116. Rotation of plate 18 in the X-Y plane causes a slight displacement in the X direction for which compensation can be made by adjusting the effective length of extensible cylinder 128 of micrometer 126.

Aligning holographic optical elements 28 and 28a to develop the position coordinate information of the exposure position on quadrant detectors 164 and 166 perforce results in the alignment of the information recorded in region 86 (FIG. 4A) of plate 18. Since the quadrant detectors are insensitive to motion along the Z axis, the alignment apparatus and method described above is useful for positioning plate 18 in a plane that is parallel to that of plate 18 in its exposure position. Fixing the position of plate 18 for no movement in the Z direction ensures that it can be aligned exactly to its exposure position.

An alternative technique for aligning plate 18 in accordance with the first preferred embodiment is explained with reference to FIG. 5B. FIG. 5B is a plan view diagram of FIG. 5A which shows holographic optical elements 28 and 28a modified to provide angularly inclined focal configurations that facilitate the alignment of plate 18 to the exact exposure position in all six degrees of freedom in the space coordinate system, without fixing the position of holder assembly 98 in the Z direction.

Holographic optical elements 28 and 28a are constructed with the light rays of the subject beams striking lenses 14 and 14a at an angle out of the Y-Z plane relative to optic axes 30 and 30a. In particular, the subject beam light rays strike lens 14 at an angle $+\theta$ and lens 14a at an angle $-\theta$. This causes the deviation of the central rays of holographic optical elements 28 and 28a by an angle $|\theta|$ from the respective optic axes 30 and 30a during reconstruction. The position coordinate information on the respective quadrant detectors 164 and 166 are recorded in the same manner as described above. Quadrant detectors 164 and 166 are not, however, insensitive to motion along the Z axis. The reasons for this are set forth below.

In FIG. 5B, plate 18 is shown in phantom, displaced by a distance 170 to the left in the Z direction from its position in FIG. 5A to explain the alignment in the space coordinate system. The central ray 172 reconstructed from holographic optical element 28 strikes detector 164 at a point 174, which is displaced in the negative X direction from focal point 20 by a distance 176 and angularly displaced by an angle $+\theta$ relative to optic axis 30. In an analogous manner, central ray 172a reconstructed from holographic optical element 28a strikes detector 166 at a point 174a, which is displaced in the positive X direction from focal point 20a by a distance 176a and angularly displaced by an angle $-\theta$ relative to optic axis 30a. Moving plate 18 a distance 170 in the Z direction causes central ray 172 (shown in phantom) to strike detector 164 at a point 178, which is displaced in the negative X direction from focal point 20 by a distance 180 that is greater than distance 176, and central ray 172a (shown in phantom) to strike detector 166 at a point 178a, which is displaced in the positive X direction from focal point 20a by a distance 180a that is greater than distance 176a. It is, of course, also true that movement of plate 18 only in the X direction only will cause the central rays 172 and 172a to strike different points on the respective detectors 164 and 166. There is, therefore, shared alignment information in the X position coordinate information of detectors 164 and 166 for motion of plate 18 in the X and Z directions.

Forming holographic optical elements 28 and 28a with subject beam light rays inclined at an angle relative to the optic axes of lenses 14 and 14a enables, therefore, the alignment of plate 18 in the six degrees of freedom in the space coordinate system without requiring that holder assembly 98 be fixed in its position along the Z axis. It will be appreciated that the measurement sensitivity of movement along the Z axis can be increased by tilting the light receiving surfaces of detectors 164 and 166 out of the X-Y plane toward the directions of the respective central rays 172 and 172a.

Figure 6:
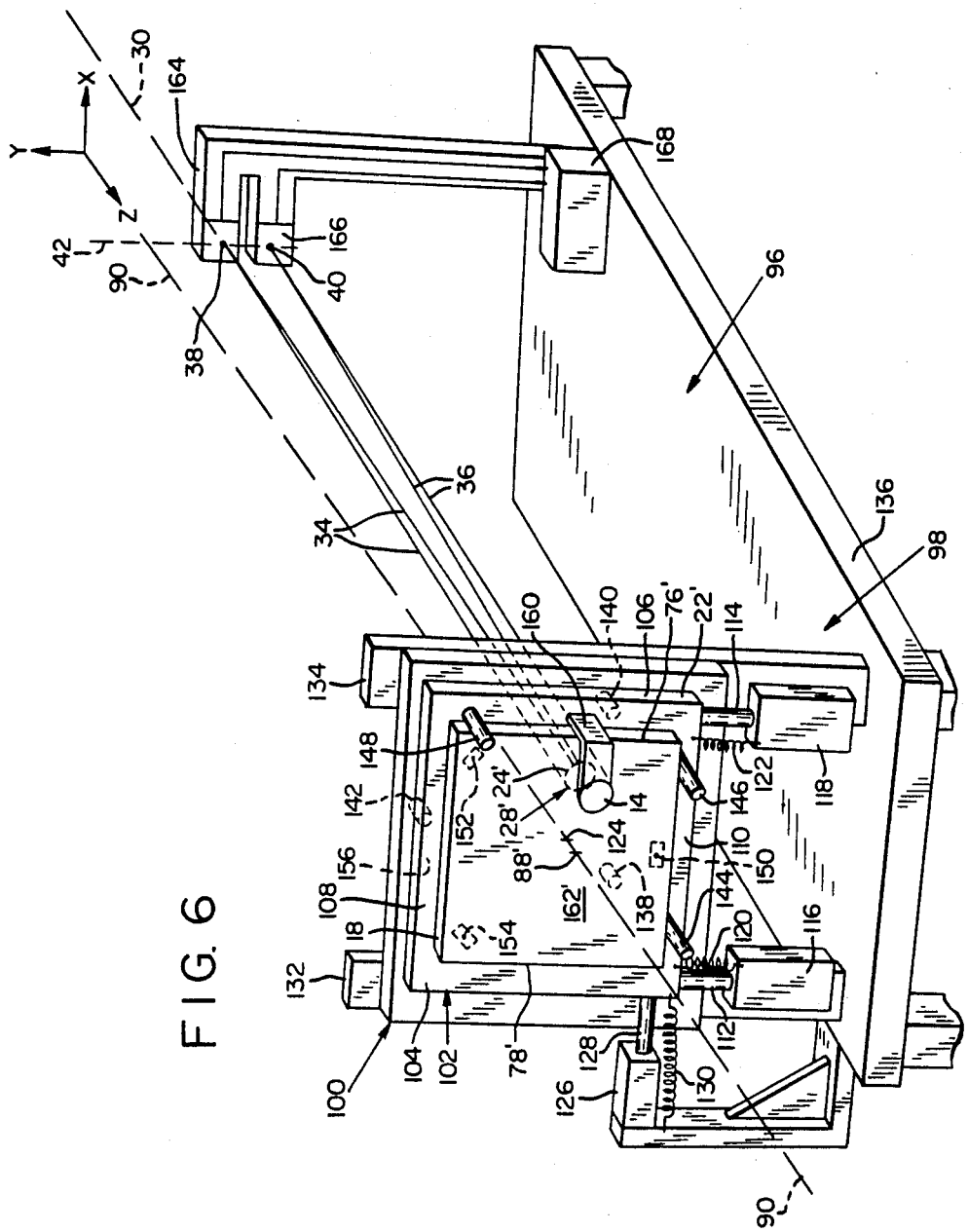
FIG. 6 is an isometric view of the adjustable holder assembly and the position detecting means of the second preferred embodiment of the invention.

FIG. 6 shows the holder assembly 98 that supports glass plate 18' during exposure and reconstruction in accordance with the second embodiment of the present invention.

With reference to FIG. 6, the two focal points of light 38 and 40 are developed from a single holographic optical element 28' and lie along the vertical line 42 that is parallel to the Y axis. The differences between the system for producing the two holographic optical elements 28 and 28a of FIGS. 5A and 5B and the system for producing the single holographic optical element 28' of FIG. 6 are that, in the system of FIG. 6: (1) optical wedge 32 (not shown in FIG. 6) is positioned between lens 14 and plate 18' to develop light beams 34 and 36; (2) quadrant detector 166 is repositioned along vertical line 42 to a location below quadrant detector 164; and (3) lens 14a and its mounting bracket 158 are removed.

With the exception of the differences recited above, the above description of the alignment apparatus and method for the system of FIGS. 5A and 5B similarly applies to that of FIG. 6 and is, therefore, not repeated.

It will be obvious to those having skill in the art that many changes may be made in the above-described details of the preferred embodiments of the present invention. As a first example, for the first preferred embodiment, two reflection-type holographic optical elements each with a focal point of predetermined length could be constructed apart from optical subsystem 96 and substituted for holographic optical elements 28 and 28a. The position coordinate information of the exposure position of plate 18 would be obtained by illuminating the holographic optical elements with reference beam 26 and recording the responses of quadrant detectors 164 and 166. The alignment of plate 18 would be accomplished in the manner described above. For the second preferred embodiment, a single reflection-type holographic optical element with two focal points of predetermined lengths can be reconstructed for use in aligning plate 18' in an analogous manner.

As a second example, the two transmission-type holographic optical elements of the first preferred embodiment and the single transmission-type holographic optical element of the second preferred embodiment could also be constructed apart from the optical subsystem 96. The position coordinate information of the exposure position of plate 18 would also be obtained by illuminating the holographic optical elements with reference beams 26 and recording the responses of quadrant detectors 164 and 166.

As a third example, the subject need not be returned to the exact position it occupied during exposure but may be placed in a predetermined position corresponding to the exposure position. To accomplish this task, one would have to calibrate the system to determine the position coordinate information of the quadrant detectors corresponding to the predetermined position. The scope of the present invention should be determined, therefore, only by the following claims.

We claim:

1. A method of aligning a subject in a space coordinate system, comprising:

supporting the subject in a first position in the system, the first position being specified by translation and rotation coordinates;

providing on the subject at least one holographic optical element to develop first and second beams of light with respective first and second predetermined focal configurations;

using first and second position detecting means to determine the positions in the system of the first and second focal configurations;

recording first and second alignment information that correspond to the positions of the respective first and second focal configurations;

changing the position of the subject from the first position;

reconstructing the first and second beams of light by illuminating the number of holographic optical elements provided on the subject;

repositioning the subject so that the information indicated by the first and second position detecting means correspond to the respective first and second alignment information recorded for the subject in the first position, thereby to align the subject to the first position or a predetermined position corresponding to the first position.

2. The method of claim 1 in which first and second holographic optical elements develop the respective first and second beams of light, and each one of the first and second holographic optical elements is constructed by:

depositing a recording medium in a region on the subject;

positioning a lens adjacent the surface of the subject;
illuminating the lens with a subject beam which propagates through the lens and the recording medium to form one of the first and second beams of light;
directing a reference beam to interfere with the subject beam to form an interference pattern in the recording medium; and
processing the recording medium to form the holographic optical element.

3. The method of claim 2 in which the first and second holographic optical elements have respective first and second optic axes and the subject beam comprises parallel light rays that propagate in an optical system which has a system optic axis, each one of the first and second optic axes being aligned parallel to the system optic axis, thereby to enable the alignment of the subject.

4. The method of claim 2 in which the first position detecting means receives the first beam of light during the construction of the first holographic optical element to develop the first alignment information, and the second position detecting means receives the second beam of light during the construction of the second holographic optical element to develop the second alignment information.

5. The method of claim 2 in which reconstruction of the first and second beams of light is accomplished by reference beam reconstruction of the number of holographic optical elements.

6. The method of claim 2 in which the first and second holographic optical elements have respective first and second optic axes and the subject beam comprises parallel light rays that propagate in an optical system which has a system optic axis, each one of the first and second optic axes being angularly inclined relative to the system optic axis, thereby to enable the alignment of the subject.

7. The method of claim 1 in which each one of the first and second focal configurations is substantially a point.

8. The method of claim 1 in which the subject is supported by a stationary holder which permits translational and rotational movement of the subject in only one plane, thereby to promote alignment of the subject.

9. The method of claim 1 in which at least one of the first and second position detecting means comprises a quadrant detector.

10. The method of claim 1 in which a single holographic optical element develops the first and second beams of light, and the single holographic optical element is constructed by:
depositing a recording medium in a region on the subject;
positioning a beam splitting means adjacent one of the surfaces of the lens;
illuminating the beam splitting means with a subject beam to produce first and second component beams that propagate through the recording medium to form the first and second beams of light; and
directing a reference beam to interfere with the first and second component beams to form an interference pattern in the recording medium; and
processing the recording medium to form the holographic optical element.

11. The method of claim 10 in which the first position detecting means receives the first beam of light during the construction of the first holographic optical element to develop the first alignment information, and the second position detecting means receives the second beam of light during the construction of the second holographic optical element to develop the second alignment information.

12. The method of 10 in which the beam splitting means comprises an optical wedge.

13. Apparatus for aligning a subject in a space coordinate system, comprising:
holder means to support the subject in a first position in the system, the first position being specified by translation and rotation coordinates;
at least one holographic optical element provided on the subject to develop first and second beams of light with respective first and second focal configurations;
position detecting means to provide first and second alignment information that correspond to the positions in the system of the respective first and second focal configurations;
recording means to record the first and second alignment information; and
illuminating means to illuminate the number of holographic optical elements provided on the subject to reconstruct the first and second beams of light, thereby, after displacement of the subject from the first position, to reconstruct the first and second focal configurations and promote the alignment of the subject to the first position or a predetermined position corresponding to the first position.

14. The apparatus of claim 13 in which the holder means permits translational and rotational movement of the subject in only one plane, thereby to promote the alignment of the subject.

15. The apparatus of claim 13 in which first and second holographic optical elements develop the respective first and second beams of light, have respective first and second optic axes, and comprise part of an optical system which has a system optic axis; and the first and second optic axes are angularly inclined relative to the system optic axis, thereby to enable the alignment of the subject.

16. The apparatus of claim 13 in which each one of the number of holographic optical elements is constructed by the interference of a reference beam and a different subject beam, and the first and second focal configurations are reconstructed by reference beam reconstruction of the number of holographic optical elements.

17. The apparatus of claim 13 in which each one of the first and second focal configurations is substantially a point.

18. The apparatus of claim 13 in which at least one of the first and second position detecting means comprises a quadrant detector.

* * * * *